United States Patent
Lee

(10) Patent No.: US 7,460,519 B2
(45) Date of Patent: Dec. 2, 2008

(54) PACKET DATA PROCESSING APPARATUS AND METHOD OF WIDEBAND WIRELESS LOCAL LOOP (W-WLL) SYSTEM

(75) Inventor: Won-Hyoung Lee, Gyeonggi-Dom (KR)

(73) Assignee: LG Electronics Inc., Seoul (KR)

( * ) Notice: Subject to any disclaimer, the term of this patent is extended or adjusted under 35 U.S.C. 154(b) by 1054 days.

(21) Appl. No.: 10/200,944

(22) Filed: Jul. 24, 2002

(65) Prior Publication Data

US 2003/0021263 A1    Jan. 30, 2003

(30) Foreign Application Priority Data

Jul. 27, 2001    (KR)    ................ 2001-45306

(51) Int. Cl.
*H04L 12/56*    (2006.01)

(52) U.S. Cl. .................................... 370/352

(58) Field of Classification Search ................ 370/352, 370/353, 354, 356
See application file for complete search history.

(56) References Cited

U.S. PATENT DOCUMENTS 6,400,729 B1 *    6/2002    Shimadoi et al. ............ 370/466

6,674,733 B1 *    1/2004    Huusko ...................... 370/329

OTHER PUBLICATIONS

Hong et al., 'A Scheduling Method for Bounded Delay Services in High Speed Networks', Jun. 2000, Communications 2000, IEEE, vol. 2, pp. 863-867.*
Yoon et al., 'A Wireless Local Loop System Based on Wideband CDMA Technology', Oct. 1999, IEEE Communications Magazine, pp. 128-135.*

* cited by examiner

*Primary Examiner*—Melvin Marcelo
(74) *Attorney, Agent, or Firm*—Ked & Associates, LLP

(57) ABSTRACT

A packet data processing apparatus of a wide-band wireless local loop (W-WLL) system includes a local area network (LAN) controller for performing an interface with a LAN and transmitting and receiving a packet data. The system further includes an high-level data link control (HDLC) controller for transmitting and receiving a packet data to and from a subscriber wireless connection unit through an HDLC channel, a dynamic random access memory having a first buffer for storing a mobile image packet data transmitted between the HDLC controller and the LAN controller and a second buffer for storing a packet data other than the mobile image, and a CPU for performing the corresponding control function of a packet data routing unit. Buffers are utilized and managed separately for transmitting mobile image data and general data from the packet data routing unit of the W-WLL system to the Internet.

21 Claims, 4 Drawing Sheets

PACKET DATA PROCESSING APPARATUS AND METHOD OF WIDEBAND WIRELESS LOCAL LOOP (W-WLL) SYSTEM

BACKGROUND OF THE INVENTION

1. Field of the Invention

The present invention relates to a packet data processing apparatus and method of a wideband wireless local loop (W-WLL) system, and more particularly, to a packet data processing apparatus and method of a wideband wireless local loop (W-WLL) system that is capable of discriminating and separately processing general packet data and mobile image packet data.

2. Background of the Related Art

A wireless local loop (WLL) is a system in which a certain section between each subscriber terminal and public line exchange is wireless rather than using wire in the existing public switching telephone network (PSTN) system. The WLL is advantageous in that the WLL telephone network can be easily installed than the existing wired telephone network system. The facility extension of the WLL system is less expensive, and the network designing is favorably flexible when the subscribers increase and a re-design is necessary.

In addition, unlike the existing narrowband code division multiple access (CDMA) network, the wideband CDMA WLL system allows integrated services digital network (ISDN) service and a packet network implementation as well as calls, facsimile and data transmission. FIG. 1 is a block diagram showing the construction of a general W-WLL system. The general W-WLL system includes a radio interface unit (RIU) 20 for receiving a signal of a user from a terminal 10 at home and transmitting it to a base station, a radio port (RP) 30 for handling the connection and releasing of a bearer wirelessly with respect to the radio interface unit (RIP) 20, a radio port controller (RPC) 40 for performing a function of connecting a call link between the radio port (RP) 30 and an exchange, and a router 50 for handling connection with the Internet.

The general W-WLL system further includes a subscriber interface unit and the radio port 30 that are connected wirelessly. The radio port (RP) 30 and the radio port controller (RPC) 40 are connected by an E1 relay line, and the radio port controller 40 and the router 50 are connected by an ethernet. The radio information unit 20 is connected to the Internet through a point-to-point protocol (PPP) to provide an Internet service to each terminal 10.

In the W-WLL system, a packet data routing unit (PDRU) is mounted in the radio port controller 40. It sets and manages the point-to-point protocol (PPP) connection of each terminal 10, and changes a PPP frame transmitted from the terminal 10 to an ethernet frame format and then transmits it to the router 50. In addition, the PDRU also serves to convert the ethernet frame transmitted from the router 50 into a PPP frame then transmit it to the corresponding terminal 10.

In the conventional packet data processing apparatus of the W-WLL system, the packet data transmitted from the Internet is received by a local area network (LAN) controller first, then transmitted to a buffer. Subsequently, the packet data transmitted to the buffer is extracted by a high-level data link control (HDLC) controller and transmitted to the terminal 10 after passing the RIU 20 through an HDLC channel.

At this time, a bandwidth of a general LAN controller is 10 Mbps, and a bandwidth of the HDLC channel is 385 Kbps at the maximum. Accordingly, one buffer is installed between the LAN controller of the PDRU and the HDLC controller in order to solve the bandwidth difference. In the W-WLL system, a plurality of terminals share a single HDLC channel. When a user connected to an arbitrary terminal accesses a general Internet broadcast channel site and watches a mobile image, a very large amount of mobile image packet data are transmitted to the buffer through the LAN controller, and thus, a large amount of mobile image packets exist in the buffer.

As a result, the conventional packet data processing apparatus has a problem that when a user obtains his or her desired information, then requests a relatively less amount of data, the request usually will be delayed due to the mobile image packet occupying the buffer.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is an object of the present invention to provide a packet data processing apparatus and method of a wideband-wireless local loop (W-WLL) system that is capable of improving service quality of a packet data routing by separately managing a packet for transmitting mobile image data and for transmitting general data among packets transmitted to the Internet from a packet data routing unit (PDRU) by using separate buffers.

In order to achieve at least the above objects in whole or in parts, there is provided a packet data processing apparatus of a W-WLL system that includes a local area network (LAN) controller for performing an interface with a LAN and transmitting and receiving a packet data. The system further includes an HDLC controller for transmitting and receiving a packet data to and from a subscriber wireless connection unit through a HDLC channel, a dynamic random access memory (DRAM) for discriminatingly storing data transmitted between the HDLC controller and the LAN controller, and a CPU for controlling the DRAM, the LAN controller and the HDLC controller, and concurrently performing a function of a packet data routing unit.

To achieve at least these advantages in whole or in parts, there is further provided a packet data processing apparatus of a W-WLL system in which a plurality of buffers for a packet for transmitting mobile image data and for a packet for transmitting general data among packet data transmitted from a packet data routing unit to the Internet are separately constructed.

In order to achieve at least these advantages in whole or in parts, there is further provided a packet data processing apparatus of a W-WLL system includes a LAN controller for performing an interface with a LAN, and transmitting and receiving a packet data. The system further includes an HDLC controller for transmitting and receiving a packet data to and from a subscriber wireless connection unit through an HDLC channel, a dynamic random access memory having a first buffer for storing a mobile image packet data transmitted between the HDLC controller and the LAN controller and a second buffer for storing a packet data other than the mobile image, and a CPU for performing the corresponding control function of a packet data routing unit.

To achieve at least these advantages in whole or in parts, there is further provided a packet data processing method of a W-WLL system in which buffers for packet for transmitting mobile image data and for packet for transmitting general data are separated in order to transmit packet data transmitted from a packet data routing unit to the Internet. The W-WLL system further comprises checking if a received Internet protocol (IP) packet is a transmission control packet, determining the port number through which a packet data is transmitted according to whether or not the received IP packet is the transmission control packet, and discriminating mobile image data other data, then storing these data in a corresponding buffer.

To achieve at least these advantages in whole or in parts, there is further provided a packet data processing method of a W-WLL system includes checking if a received IP packet is a transmission control packet, and sensing the port number transmitting the data if the received IP packet is the transmission control protocol (TCP) packet. The W-WLL system stores the transmitted IP packet in a buffer for processing a mobile image data if the port number is the number indicating the mobile image data. If the received packet is not the TCP packet or if the port number is not the number indicating mobile image data, then storing the transmitted IP packet in a buffer for processing the general data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A packet data processing apparatus and method of a W-WLL system in accordance with a preferred embodiment of the present invention will now be described with reference to the accompanying drawings.

Figure 1:
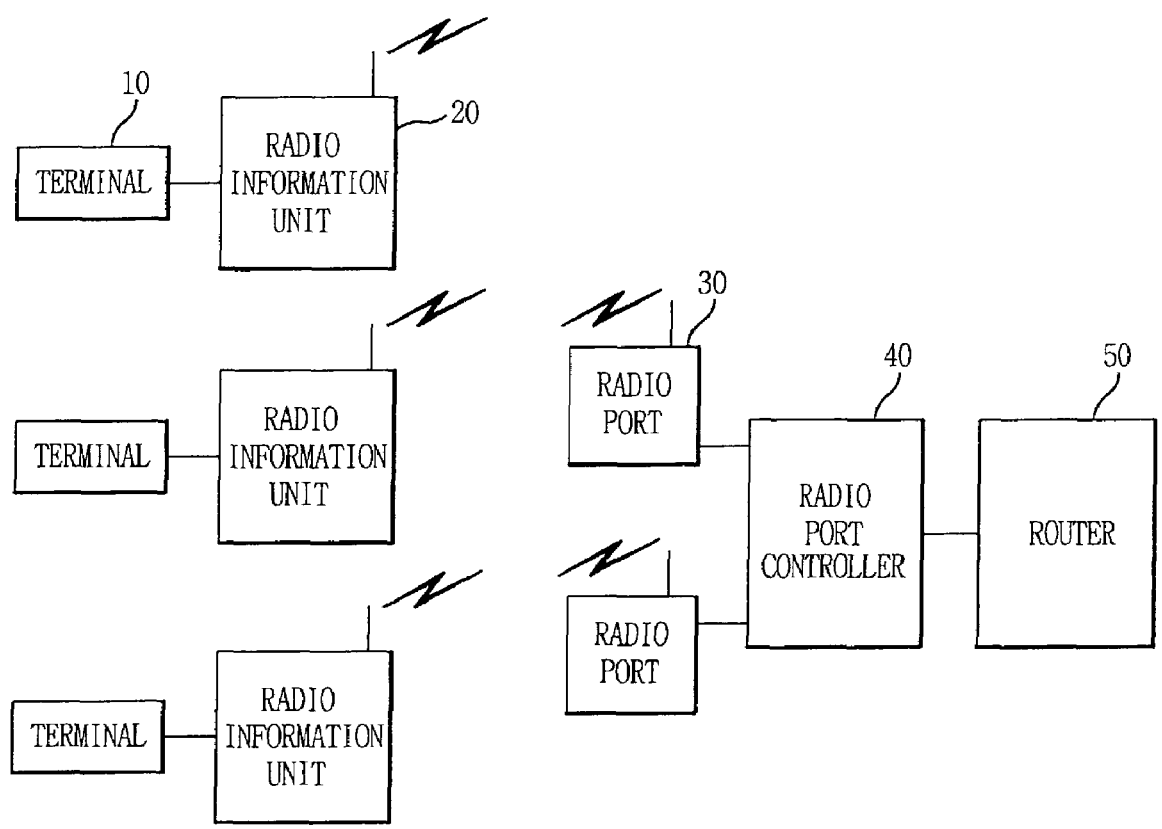
FIG. 1 is a block diagram showing the construction of a general wideband-wireless local loop (W-WLL) system.
Figure 2:
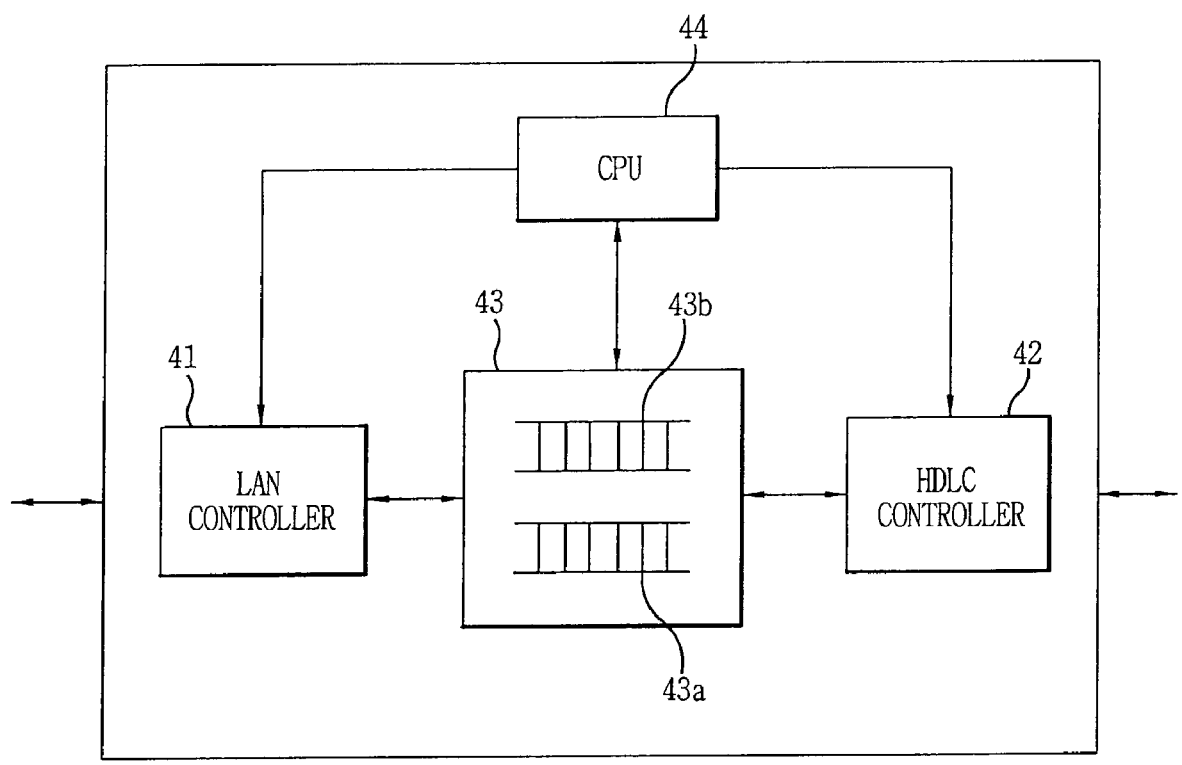
FIG. 2 is a drawing illustrating a packet data processing apparatus of a W-WLL system in accordance with one of the preferred embodiments of the present invention.

As shown in FIG. 2, a preferred embodiment of a packet data processing apparatus of a W-WLL system includes an LAN controller 41 for performing an interface with a local area network (LAN) and transmitting and receiving a packet data to and from the LAN. The preferred embodiment further includes a high-level data link control (HDLC) controller 42 for transmitting and receiving a packet data to and from a subscriber wireless connection unit 20 through a high level data link control (HDLC) channel. The general W-WLL system further includes a dynamic random access memory (DRAM) 43 for buffering a data transmitted between the HDLC controller 42 and the LAN controller 41, and having a plurality of buffers 43a and 43b for discriminatingly storing a packet data inputted from the LAN controller 41. A central processing unit (CPU) 44 for controlling the buffers 43a and 43b, the LAN controller 41 and the HDLC controller 42, performs a function of a packet data routing unit.

The DRAM 43 is constructed by a plurality of buffers, for example, by including the first buffer 43a for storing a mobile image packet data among data transmitted from the LAN controller 41, and the second buffer 43b for storing data other than the mobile image data among the data transmitted from the LAN controller 41.

Figure 3:
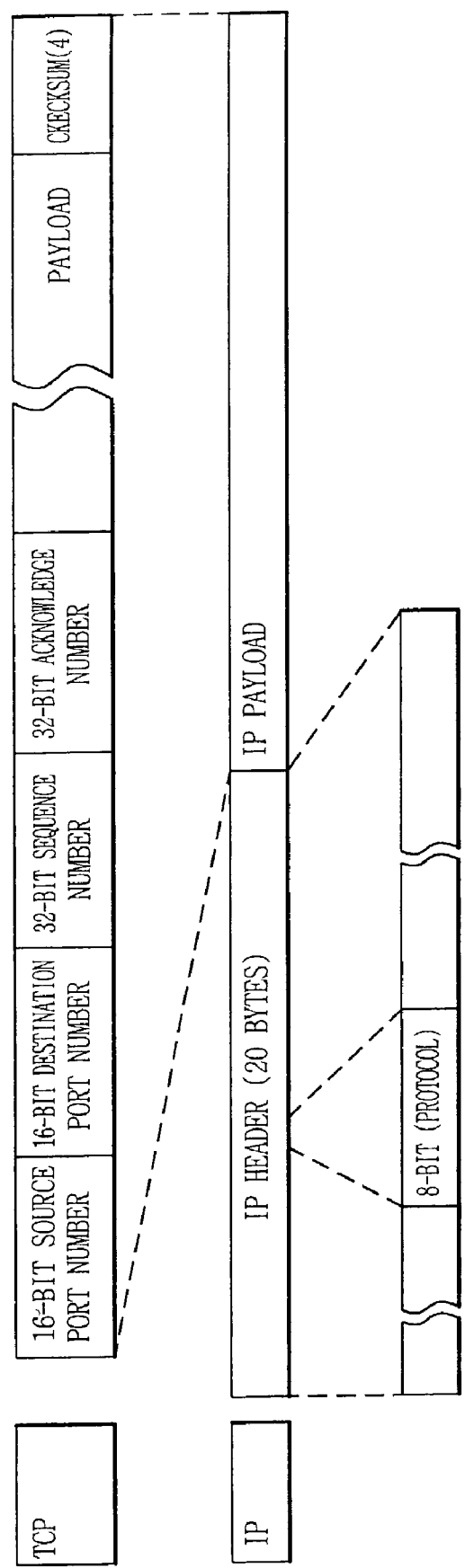
FIG. 3 is a drawing illustrating a format of a packet data in accordance with one of the preferred embodiments of the present invention.

FIG. 3 is a drawing illustrating a format of a packet data in accordance with a preferred embodiment of the present invention. As shown in FIG. 3, a packet data includes a TCP segment containing a sequence number, an acknowledge number, a checksum, or the like, and a 20 byte IP header.

The IP header includes a 8 bit field containing information of a protocol to allow a corresponding packet data to be identified as a TCP packet or a UDP packet. Additionally, the IP header provides information of whether a corresponding packet data is mobile image data or general data can also be identified by a source port number of the TCP layer. For example, on the assumption that the mobile image data is transmitted through a port number of 1755, the CPU 44 identifies the port number of the received packet data. If a port number is 1755, the CPU 44 identifies the received packet data as a packet data containing a mobile image data. Meanwhile, if the port number is other numbers than 1755, the CPU 44 identifies the received packet data as a packet data containing a data other than the mobile image, thereby separately storing each packet data in buffer 43a and 43b.

Figure 4:
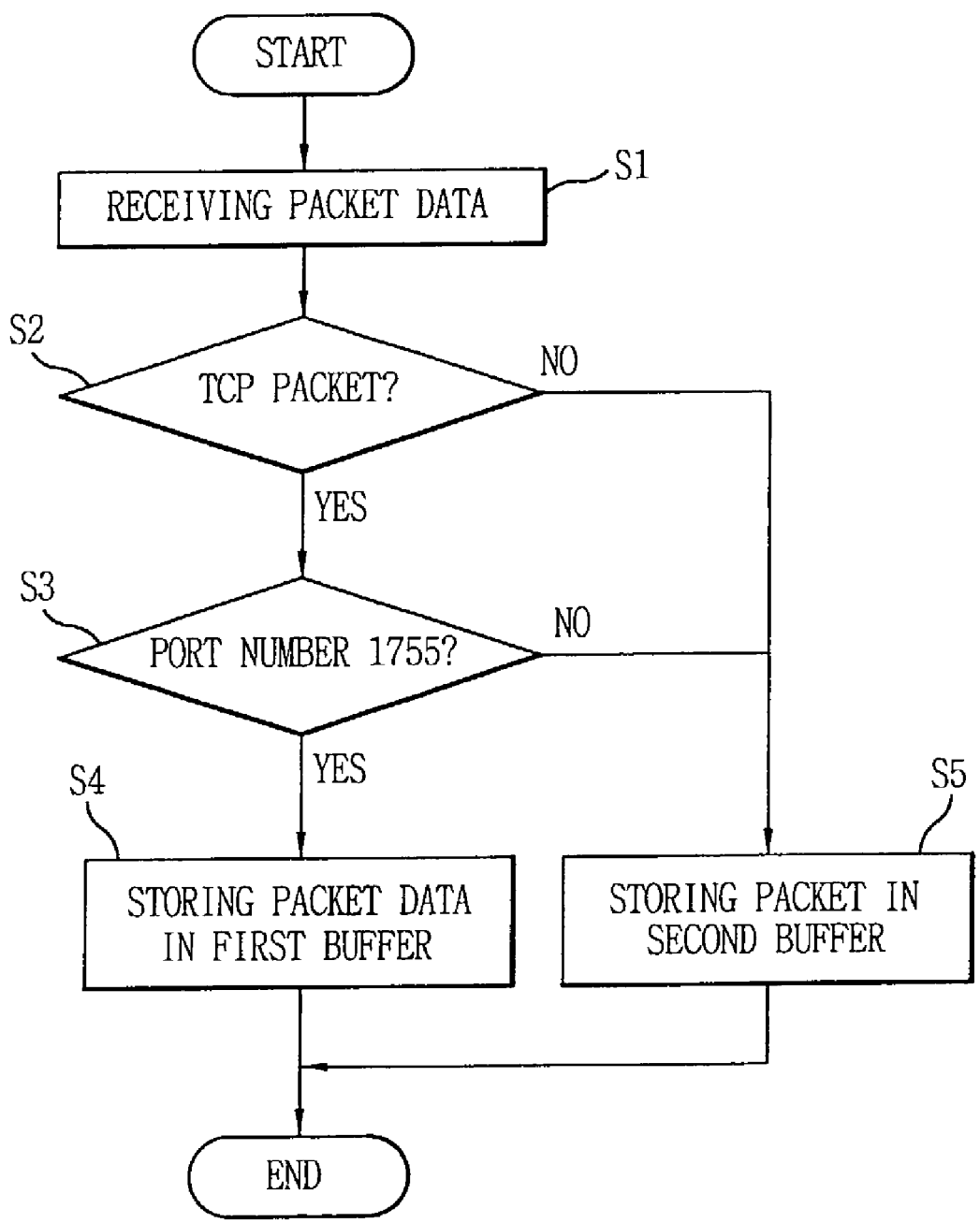
FIG. 4 is a flow chart of a packet data processing method of a W-WLL system in accordance with one of the preferred embodiments of the present invention.

FIG. 4 is a flow chart of a packet data processing method of a W-WLL system in accordance with another preferred embodiment of the present invention. As shown in FIG. 4, it is checked whether an IP packet received from a router or the Internet is a transmission control protocol packet (steps S1, S2). If the IP packet is the transmission control packet, it is then determined whether the port number is a number indicating a mobile image data (step S3).

In this respect, since the port number indicating a mobile image data is set as 1755, it can be determined if the packet data is a mobile image data only by identifying the port number. If the port number is a number indicating a mobile image data, the transmitted IP packet is stored in the buffer for processing mobile image data (step S4). If, however, the packet data is not the transmission control protocol packet, or if the port number is not a number indicating a mobile image data, the transmitted IP packet is stored in the buffer for processing general data (step S5).

In the wideband-wireless local loop system, the packet data processing apparatus and the format of the packet data will now be described in detail with reference to the accompanying drawings. First, it is assumed that, on the Internet, a mobile image packet data is transmitted through the transmission control protocol and '1755' is used as a port number.

The packet data processing apparatus of a preferred embodiment of the present invention includes more than two buffers in the DRAM 43, of which the first buffer 43a is used for a mobile image packet data and the second buffer 43b is used for storing a packet data other than the mobile image. If a packet data received from the local area network controller 41 is a transmission control protocol and its port number is 1755, the packet data routing unit determines that it is a mobile image packet data and transmits the data to the first buffer 43a for storing the mobile image packet data and further transmits the remaining packet data to the second buffer 43b for storing except the mobile image packet data.

Furthermore, the received packet data can be identified as either a TCP packet or a user datagram protocol (UDP) packet by using 8 bit protocol information of the IP header. Specifically, the data can be determined whether a source port number of '1755' is used by the first 16 bit of the TCP packet. As a result, the mobile image packet data and the general data can therefore be separated.

The packet data respectively transmitted to the first buffer 43a and the second buffer 43b are later extracted from the buffers 43a and 43b by the high-level data link control controller 42 and, subsequently, transmitted to the high-level data link control channel. At this time, if a packet data only exists in one of the two buffers, the data is extracted and transmitted from the corresponding buffer only. If, however, packet data exist in both buffers, the packet data are extracted sequentially and then transmitted from both buffers.

The frequency employed by the CPU 44 to extract packet data can be adjusted according to an application field used by the two buffers. However, there are other factors can be used to adjust the frequency.

Based on the description set forth above, the packet data processing apparatus and method of a W-WLL system of the present invention has many advantages. First, even though a user connected to the high-level data control channel receives a mobile image packet data, the time delay for a different user who requested a general data to obtain the required information can be reduced. In addition, buffers for transmitting a packet of mobile image data and a packet of general data among the packet data transmitted from the packet data routing unit of the W-WLL system to the Internet are separately managed. Thus, the service quality of the packet data routing can be improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for processing a packet data of a wideband wireless local loop (W-WLL) system comprising:
    a local area network (LAN) controller for performing an interface with a LAN and transmitting and receiving the packet data;
    a high-level data link control (HDLC) controller for transmitting and receiving the packet data to and from a subscriber wireless connection unit through a HDLC channel;
    a memory for separately storing data transmitted between the HDLC controller and the LAN controller, wherein the memory includes a plurality of buffers for separately storing packet data inputted from the LAN controller, the plurality of buffers comprising:
        a first buffer for storing a mobile image data among data transmitted from the LAN controller, and
        a second buffer for storing a packet data other than the mobile image data among the data transmitted from the LAN controller; and
    a processor for controlling the memory, the LAN controller and the HDLC controller, and concurrently, performing a function of a packet data routing unit, wherein the apparatus determines that packet data is mobile image data based on a port number within a header of the packet data being a specific number and the apparatus further stores the mobile image data in the first buffer when the packet data is determined to be mobile image data based on the port number within the header being the specific number, and the apparatus stores data in the second buffer when the packet data is determined to not be mobile image data based on the port number within the header of the packet data not being the specific number.

2. The apparatus of claim 1, wherein the apparatus determines that the packet data is mobile image data when the port number within the header is the specific number of 1755.

3. The apparatus of claim 1, wherein the apparatus determines that the packet data is the packet data other than the mobile image data when the port number within the header is other than the specific number of 1755.

4. An apparatus for processing packet data of a W-WLL system, the apparatus including a plurality of buffers for storing the packet data, the apparatus comprising:
    a determining device to determine that the packet data includes mobile image packet data when a port number within a header of the packet data is a specific number and determines that the packet data does not include the mobile image packet data when the port number within the header of the packet data is not the specific number;
    a first buffer for storing the mobile image packet data among data transmitted from a local area network (LAN) controller when the determining device determines that the packet data includes mobile image packet data by determining that the port number within the header of the packet data is the specific number; and
    a second buffer for storing a packet data other than the mobile image packet data among the data transmitted from the LAN controller when the determining device determines that the packet data does not include the mobile image packet data by determining that the port number within the header of the packet data is not the specific number,
    wherein the first buffer and the second buffer are separately managed for transmitting the mobile image packet data and the other data, respectively, the first buffer and the second buffer being operatively connected between the LAN controller and a high-level data link control (HDLC) controller.

5. The apparatus of claim 4, wherein the first buffer and the second buffer are separately managed for transmitting the mobile image packet data and the other data by a packet data routing device in the W-WLL system.

6. The apparatus of claim 4, wherein the determining device determines that the packet data includes mobile image packet data by determining that the port number within the header is the specific number of 1755.

7. The apparatus of claim 4, wherein the determining device determines that the packet data includes packet data other than mobile image packet data by determining that the port number within the header is other than the specific number of 1755.

8. An apparatus for processing a packet data of a W-WLL system comprising:
    a local area network (LAN) controller for performing an interface with an LAN and transmitting and receiving the packet data;
    an high-level data link control (HDLC) controller for transmitting and receiving a packet data to and from a subscriber wireless connection unit through an HDLC channel;
    a memory having a first buffer for storing a mobile image packet data transmitted between the HDLC controller and the LAN controller and a second buffer for storing a packet data other than the mobile image packet data; and a processor for performing a corresponding control function of a packet data routing unit, wherein the apparatus determines that a received packet data is mobile image packet data and stores the mobile image packet data in the first buffer when the packet data is determined to be mobile image packet data and stores data in the second buffer when the packet data is determined to not be mobile image packet data, wherein the apparatus determines the packet data is mobile image packet data by identifying a port number included within a header of the received packet data as being a specific number, and the apparatus determines the packet data is not mobile image packet data by identifying that the port number included within the header is not the specific number.

9. The apparatus of claim 8, wherein the apparatus determines that the packet data is mobile image packet data when the port number within the header is identified as the specific number of 1755.

10. The apparatus of claim 8, wherein the apparatus determines that the packet data is not mobile image packet data when the port number within the header is identified as other than the specific number of 1755.

11. A method for processing a packet data of a W-WLL system comprising:

determining that a received Internet protocol (IP) packet is a transmission control protocol (TCP) packet;

after determining that the received IP packet is a TCP packet, determining that a port number in a header of the received IP packet corresponds to mobile image data when the received IP packet is determined to be a TCP packet, wherein the determination is based on the port number in the header corresponding to a specific number;

identifying the mobile image data and other data in the received IP packets, wherein the other data is identified when the port number in the header fails to correspond to the specific number;

storing the data identified as mobile image data in a first buffer; and storing the data other than the mobile image data in a second buffer, wherein the first buffer and the second buffer are separately managed for transmitting the mobile image data and the other data, respectively, the first buffer and the second buffer being operatively connected between a local area network (LAN) controller and a high-level data link control (HDLC) controller in the W-WLL system.

12. The method of claim 11, wherein the determining comprises identifying the packet as the TCP packet by using protocol information contained in a header of the received IP packet.

13. The method of claim 11, wherein the first buffer and the second buffer are separately managed for transmitting the mobile image data and the other data by a packet data routing device in the W-WLL system.

14. The method of claim 11, wherein the port number in the header identifies packet data as corresponding to the mobile image data.

15. The method of claim 11, wherein the determining includes determining that the IP packet corresponds to mobile image data when the port number within the header is the specific number of 1755.

16. The method of claim 11, wherein the other data is identified when the port number within the header is other than the specific number of 1755.

17. A method for processing a packet data of a W-WLL system comprising:

determining that a received Internet protocol (IP) packet is a transmission control protocol (TCP) packet;

after determining that the received IP packet is a TCP packet, identifying the received IP packet as corresponds to mobile image data when a header of the received IP packet contains a port number corresponding to a specific number, and identifying the received IP packet as corresponding to general data when the header of the received IP packet contains a port number that does not correspond to the specific number;

storing the received IP packet in a first buffer for processing mobile image data when the received packet is determined to be a TCP packet and the port number corresponds to the specific number identifying mobile image data; and storing the received IP packet in a second buffer for processing general data when the port number does not correspond to the specific number identifying mobile image data, the general data being non-image data, wherein the first buffer and the second buffer are separately managed for transmitting the mobile image data and the general data, respectively, the first buffer and the second buffer being operatively connected between a local area network (LAN) controller and a high-level data link control (HDLC) controller in the W-WLL system.

18. The method of claim 17, wherein the TCP packet is identified by protocol information contained in the header of the received IP packet.

19. The method of claim 17, wherein the first buffer and the second buffer are separately managed for transmitting the mobile image data and the general data by a packet data routing device in the W-WLL system.

20. The method of claim 17, wherein storing the received IP packet in the first buffer includes storing the received IP packet in the first buffer when the received IP packet is determined to be a TCP packet and the port number in the header is the specific number of 1755.

21. The method of claim 17, wherein storing the received IP packet in the second buffer includes storing the received IP packet in the second buffer when the port number in the header does not correspond to the specific number of 1755.

* * * * *